Oct. 17, 1933.   O. H. PARSONS   1,930,958
WAVE MOTOR
Filed Feb. 24, 1932   3 Sheets-Sheet 1
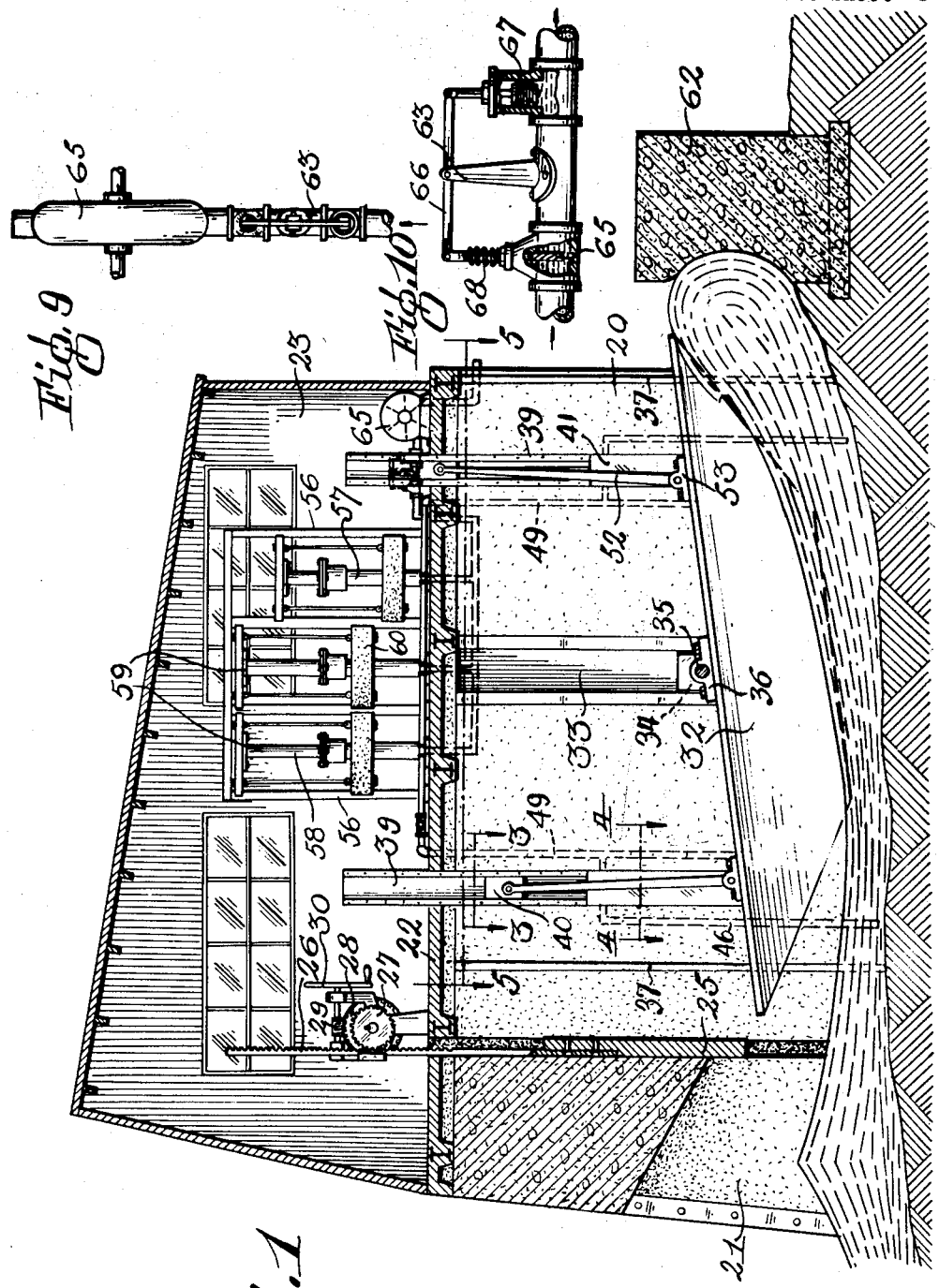
Osborne H. Parsons Inventor
By ...... Attorneys Oct. 17, 1933.   O. H. PARSONS   1,930,958
WAVE MOTOR
Filed Feb. 24, 1932   3 Sheets-Sheet 2
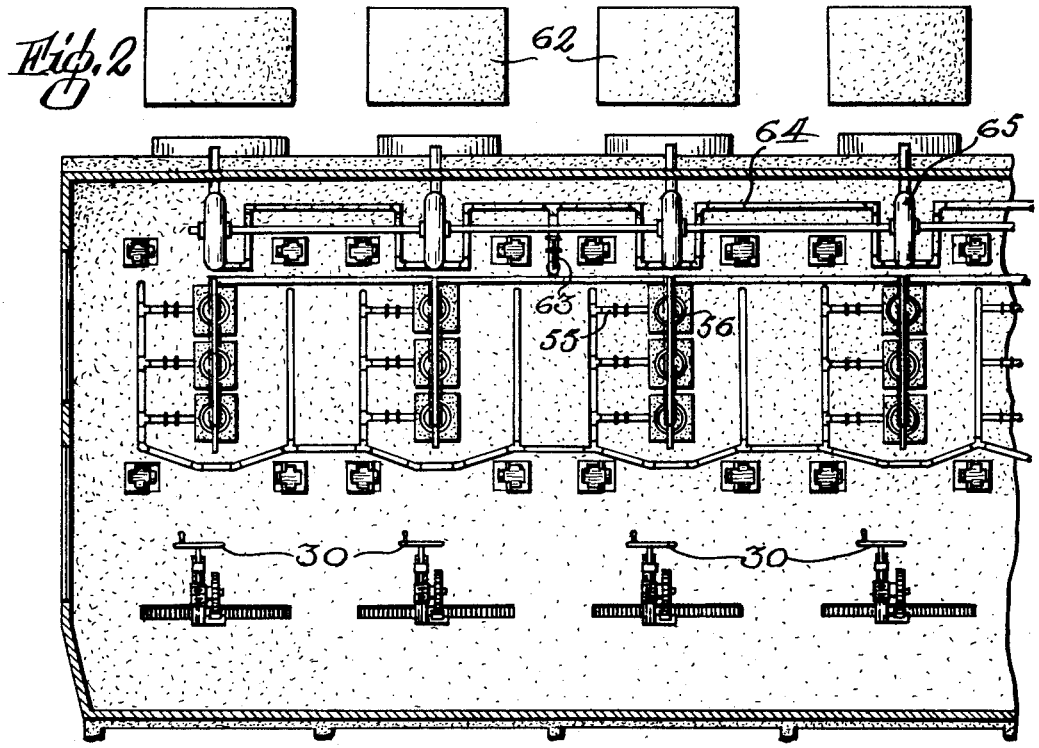
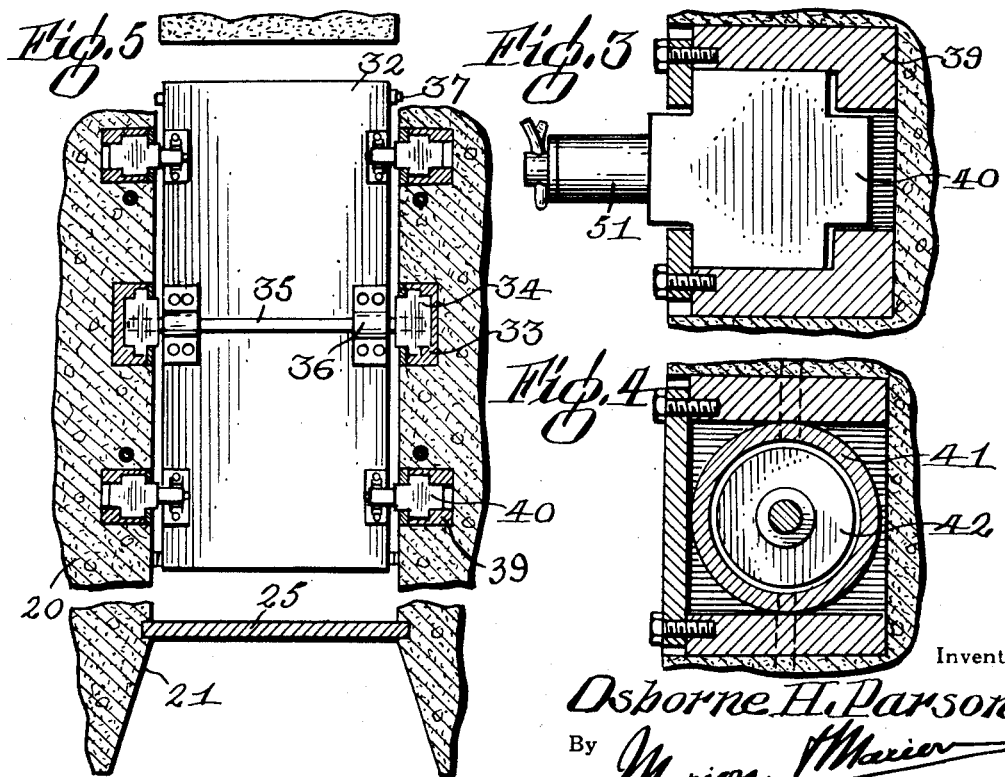
Inventor
Osborne H. Parsons
By Marion & Marion
Attorneys

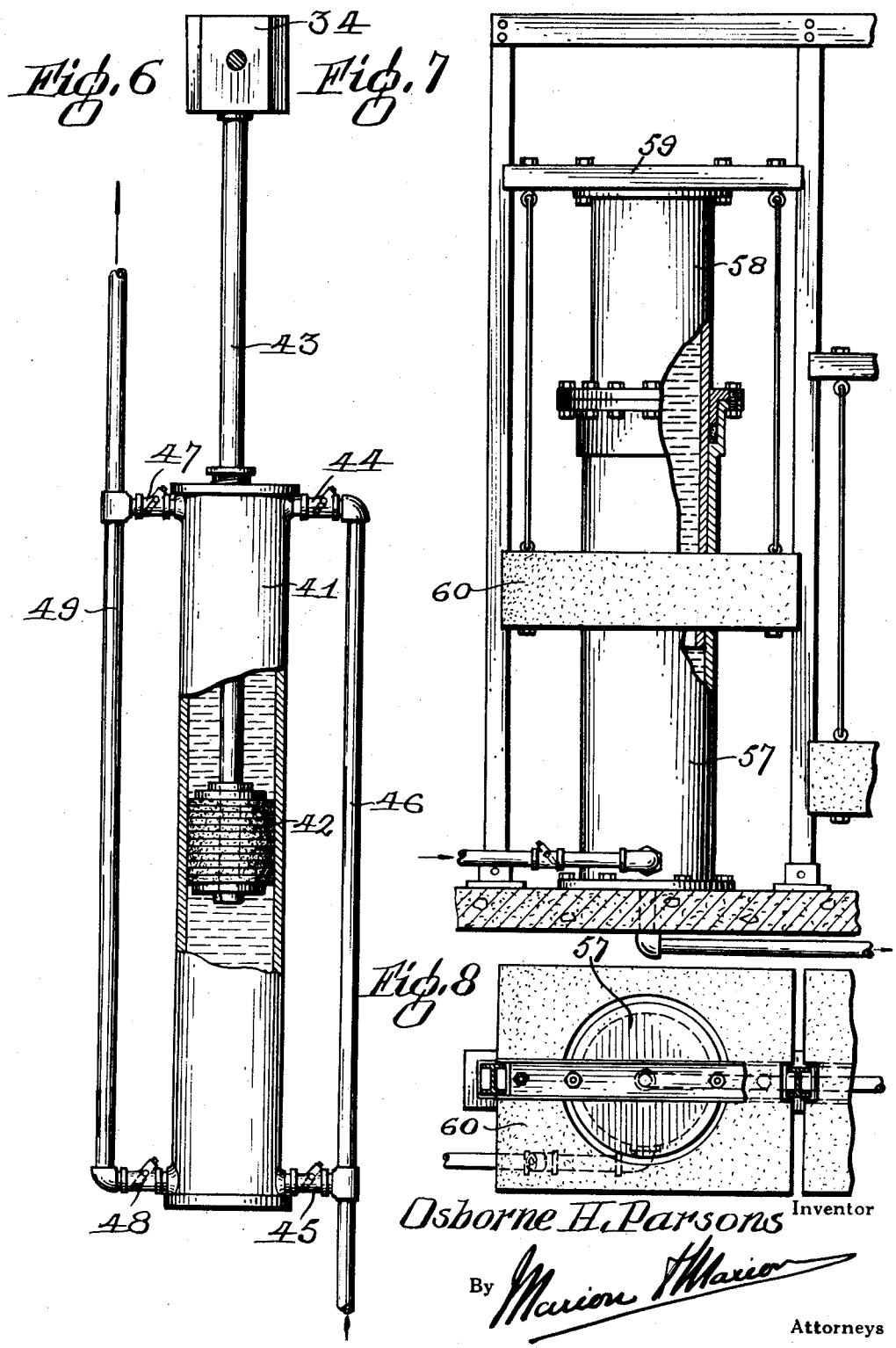

Patented Oct. 17, 1933

1,930,958

UNITED STATES PATENT OFFICE 1,930,958

WAVE MOTOR

Osborne H. Parsons, Halifax, Nova Scotia, Canada

Application February 24, 1932. Serial No. 594,917

3 Claims. (Cl. 103—70)

The present invention relates to improvements in wave motor construction.

An important object of the invention is to provide a wave motor designed so as to generally improve the efficiency of this type of apparatus.

A further object of the invention is the provision of a wave motor embodying means for accumulating all of the power generated by the operation thereof.

Another object of the invention is the provision of a wave motor having an improved type of pump operating mechanism.

Still another object of the invention is the provision of a wave motor of the above type embodying means for automatically regulating the pressure of fluid discharged from the accumulator system.

Still another feature of the invention is the provision of a wave motor of the above character which will be relatively simple in construction and reliable in operation.

Other objects and advantages of the invention will become apparent as the description progresses.

In the accompanying drawings forming a part of this specification and in which like reference characters are employed to designate corresponding parts throughout the same:

Figure 1 is a vertical longitudinal section through a wave motor assembly,

Figure 2 is a horizontal section through the upper portion of the housing,

Figure 3 is an enlarged transverse section taken on line 3—3 of Figure 1, with a portion of the mechanism detached, Figure 4 is a similar view taken on line 4—4 of Figure 1, Figure 5 is a fragmentary plan view taken on line 5—5 of Figure 1, Figure 6 is a front elevational view of one of the pump mechanisms, Figure 7 is a front elevational view of one of the accumulator units, Figure 8 is a top plan view of the same partly in section, Figure 9 is a top plan view of a turbine and pressure regulating apparatus, and Figure 10 is a side elevational view of the pressure regulating apparatus partly in section.

Referring to the drawings, wherein for the purpose of illustration is shown a preferred embodiment of the invention, the numeral 20 designates one of the piers of which several are employed and which are formed to extend the parellel arrangement to provide therebetween a series of inlets. The pier construction is preferably to be disposed along the coast of an ocean or other body of water, and constructed so that the water may enter the inlets. As shown to advantage in Figure 5, the facing walls of the piers are formed so as to provide a converging entrance structure generally indicated at 21, that is, having the side walls and top of the entrance bevelled to form a substantially funneled shape front structure.

Extending horizontally over a series of piers 20 is an elevated flooring 22. Above the flooring 22 is constructed a superposed shed-like housing 23.

At the inner reduced portion of the converging entrance to each inlet is disposed a control gate 25, which may be operated manually or by motive power. In the present example, the gate 25, which is supported so as to be vertically slidable in channels in the piers, is operated by mechanism embodying a rack 26 attached to the gate and projecting upwardly therefrom. The rack 26 meshes with a spur gear 27 attached to a transverse rotary shaft journalled in a supporting frame. To the same shaft is rigidly connected a worm wheel 28 which meshes with an operating worm 29. The worm 29 is secured to a horizontal shaft journalled in suitable bearings and to one end thereof is connected a hand wheel 30. Thus, by rotatably actuating the hand wheel 30, the gate 25 may be elevated or lowered in accordance with operating conditions.

In each inlet, between the piers 20, is disposed an actuating float 32, in the form of a buoyant pontoon. The pontoon 32 is anchored in the inlet by suitable anchoring means embodying complementary guide track structures 33, mounted in vertically extending grooves formed in opposed positions in the facing walls of the piers. In each guide track 33 is slidably fitted a vertically reciprocating block 34. A transverse shaft 35 having its ends journalled in the blocks 34 is disposed transversely over the central portion of the float and is secured thereon by means of bearings 36. The end portions of the float are held against lateral displacement by means of vertically extending rods 37.

Thus, the float is rigidly held against longitudinal or lateral displacement but is capable of unobstructed vertical or oscillatory movement in correspondence with the motion of waves contacting therewith.

In each facing wall of the piers 20 are formed additional vertically extending grooves spaced from the grooves receiving the track structure 33, in which are mounted vertical guide tracks 39.

Slidably fitted in each guide track 39 is a slide block 40 mounted so as to permit efficient reciprocating movement therein. In the lower portion of each track structure 39 is secured a vertically disposed pump cylinder 41, having mounted for reciprocating movement therein a piston 42. A piston rod 43 extends through the upper head end of the cylinder 41 and connects the piston with the block 40.

At the upper and lower ends of the cylinder 41 are connected transversely extending branch pipes 44 and 45, the outer ends of which connect with a vertically disposed intake conduit 46. The lower end of the conduit 46 projects downwardly so that the open extremity will project downwardly into the sea. In each of the branch lines 45 and 46 are mounted check valves. Projecting laterally from the opposed side of the cylinder 41 and connected therewith adjacent the upper and lower ends are discharge branch pipes 47 and 48 connecting with a vertical upwardly extending delivery conduit 49. The branch pipes 47 and 48 are also provided with check valves.

Extending outwardly from each block 40 is a pivot pin 51 having pivotally connected thereto the upper extremity of a block actuating rod 52. The lower end of each rod 52 is pivotally connected with a bracket 53 secured on the top of the float adjacent the corners.

The delivery conduits 49 extend upwardly through the flooring 22 and connect, through the medium of a series of branch conduits 55, with a series of accumulators indicated at 56. I preferably provide a series of accumulators for each float, as for instance, three accumulators to each series as shown. The accumulators may be of the type shown in Figures 1 and 7, embodying a main fixed cylinder 57 having slidably fitted therein a tubular complementary section 58. On top of this section 58 is secured a cross-frame 59, having suspended therefrom a weight 60. The actual weight of the weight members 60 would be determined in accordance with the pressure in pounds per square inch at which it would be desired to maintain the liquid stored in the accumulators. I consider it advantageous that the weights of the respective accumulators in the series be variable to accommodate the delivery of fluid of varying pressure thereto.

Thus, during operation of the apparatus, a wave entering the converging entrance to the inlet is somewhat magnified by the restriction thereof. As the wave enters the inlet, it initially engages the front end or bow of the float 32 raising this end and elevating the forward blocks 40. As the wave travels through the inlet, it successively engages and elevates the central portion of the float and subsequently the stern. At the inner end of the inlet, the wave strikes a wall structure 62 which is preferably provided in the front face with the concave recess adapted to deflect the wave on to the stern so as to utilize with the greatest efficiency the force thereof. As the pontoon is oscillated, elevated and subsequently lowered, the rod 52 actuates the blocks 40 and, through the medium thereof, actuates the pump pistons 42.

The pumps which are of the double acting type will draw water through the conduit 46 during the operative movement of the piston, and discharge the same, under pressure, through the outlet branches into the delivery conduit 49. Water is pumped into a delivery pipe system, shown in Figure 2, and into the various accumulators where it is stored under constant pressure.

From the accumulators, the water is discharged through an automatic regulating apparatus generally indicated at 63 and into a distributing pipe system 64 and conducted to a series of turbines 65 or other form of motors.

The regulating apparatus shown in Figure 10 embodies a gate valve 65, the stem of which is pivotally connected with a rocking lever 66, fulcrumed at its center. The opposed end of the rocking lever 66 is pivotally connected with the upper end of the stem of a piston valve 67. Thus, when the flowing from the accumulators is above a predetermined pressure, the regulating apparatus is designed so that the piston 67 will be elevated and will cause downward closing movement of the gate valve. When the pressure of the water discharged through the regulator is lowered, a spring 68 will cause the piston valve 67 to move inwardly and simultaneously elevate the gate valve 65. By this means the fluid pressure to the turbines 65 is maintained at an approximately constant figure.

The accumulator apparatus is designed so as to accommodate and store therein, under pressure, all of the surplus fluid discharged from the pumps so that a suitable reserve for operation of the turbines is maintained in the event of diminution of wave power.

By the present wave motor construction the reciprocating and oscillating movement of the float, caused by the action of the waves entering the inlet produces a direct action upon the water pumps, so as to utilize to the utmost the power of the waves. Furthermore, by storing the accumulated water under pressure in the accumulator apparatus, a substantial reserve supply is constantly maintained and all of the power generated is utilized.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. In a wave motor, the combination with a plurality of inlet forming piers, of a float disposed in each inlet, a pair of transversely opposed blocks mounted for vertical reciprocating movement, a transversely extending shaft having its ends connected with the blocks, bearings connecting the shaft with the float so that the shaft extends transversely over the float, a series of vertically reciprocating pump blocks, rods connecting the pump blocks with the end portions of the float so that the blocks are slidably actuated during vertical movement of the float, and pumps connected with the said pump blocks.

2. In wave motor apparatus, a plurality of piers arranged to form water inlets therebetween, an elongated pontoon positioned in each inlet and occupying approximately the full space between the piers, means slidably connecting the pontoons with the piers so as to allow vertical sliding and rocking movement of the pontoons, a plurality of pumps secured vertically in recesses in the sides of the piers having a vertically projecting piston rod extending from one end, a block attached to the outer end of each piston rod and mounted to slide in a vertical guide-way, and a plurality of connecting rods pivotally connected to the pontoons and with the slidable blocks to vertically actuate the blocks and pistons upon vertical movement of the pontoons.

3. In wave-motor apparatus, a plurality of piers arranged to form water inlets therebetween, a buoyant pontoon positioned in each inlet, means connecting the pontoons with the piers so that the pontoons are guided to slide vertically, a plurality of pump cylinders secured vertically in recesses in the sides of the piers, a vertically reciprocating piston mounted in each cylinder, a piston rod attached to each piston and extending upwardly through the top of the cylinder, a slide block mounted in a vertical guide-way connected to the upper end of each piston rod, and a plurality of connecting rods pivotally connected to the pontoons and with the piston rod blocks to vertically actuate the blocks and pistons upon vertical movement of the pontoons.

OSBORNE H. PARSONS.